United States Patent

Smith et al.

[11] Patent Number: 5,775,599
[45] Date of Patent: Jul. 7, 1998

[54] GASEOUS FUEL INJECTOR FOR INTERNAL COMBUSTION ENGINE

[75] Inventors: David H. Smith, Mercer Island; Craig D. Mawle, Seattle, both of Wash.

[73] Assignee: Impco Technologies, Inc., Seattle, Wash.

[21] Appl. No.: 661,918

[22] Filed: Jun. 12, 1996

[51] Int. Cl.$^6$ .................................................. B05B 1/30
[52] U.S. Cl. .......................... 239/585.3; 239/585.4; 239/584; 239/900; 239/DIG. 19
[58] Field of Search ........................... 239/533.1, 533.2, 239/533.3, 533.4, 533.8, 533.9, 533.12, 533.14, 533.15, 583, 584, 585.1, 585.3, 585.4, 596, 900, DIG. 19, 88, 96; 123/445, 467

[56] References Cited

U.S. PATENT DOCUMENTS

| | | | |
|---|---|---|---|
| 3,464,668 | 9/1969 | Jacob | 251/129.14 |
| 3,773,265 | 11/1973 | Kent | 239/DIG. 19 |
| 3,796,409 | 3/1974 | Burckhardt et al. | 251/129.21 |
| 4,446,837 | 5/1984 | Elpern | 123/460 |
| 4,643,359 | 2/1987 | Casey | 239/585.4 |
| 4,711,400 | 12/1987 | Radaelli et al. | 239/585.4 |
| 4,760,818 | 8/1988 | Brooks et al. | 123/298 |
| 4,763,635 | 8/1988 | Ballhause et al. | 123/520 |
| 4,810,985 | 3/1989 | Mesenich | 335/261 |
| 4,946,107 | 8/1990 | Hunt | 239/585.4 |
| 5,012,982 | 5/1991 | Souma et al. | 239/585.4 |
| 5,237,980 | 8/1993 | Gillier | 123/520 |
| 5,409,165 | 4/1995 | Carroll, III et al. | 239/88 |
| 5,494,223 | 2/1996 | Hall et al. | 239/585.5 |

Primary Examiner—J. Casimer Jacyna
Attorney, Agent, or Firm—Edward A. Sokolski

[57] ABSTRACT

A gaseous fuel injector has a ball valve which is spring urged to a closed position. Positioned below this valve is the armature of an electromagnetic solenoid having an extension which abuts against the ball valve. The ball valve is normally closed against a valve seat to prevent passage of gas through the injector. With each actuation of the solenoid, the armature extension drives the ball valve upwardly from its valve seat to provide an injection of gas from the injector. The ball valve member, limit stops on the armature, and the surface along which the armature slides are all fabricated of durable, heat resistant plastic material which resists wear, provides low friction and are dimensionally stable over varying environmental conditions.

2 Claims, 2 Drawing Sheets

# 5,775,599

GASEOUS FUEL INJECTOR FOR INTERNAL COMBUSTION ENGINE

BACKGROUND OF THE INVENTION

1. Field of the Invention

This invention relates to fuel injectors for internal combustion engines, and more particularly to such an injector for use in injecting gaseous fuel.

2. Description of the Related Art

Fuel injectors utilizing control valves which are opened and closed in response to electrical solenoids are widely used for injecting fuel into internal combustion engines. The moving parts in such devices including the valve itself, which may comprise a ball which fits against a seat are subject to considerable impact forces causing wear even with highly durable parts. Such wear results in loss of calibration and the requirement for replacement of the worn parts. This problem is somewhat alleviated where liquid fuel is used which contains some lubricating oil and can provide viscous damping of the moving parts. Where the fuel is gaseous, however, such lubrication and damping of impact velocities is not afforded.

Ball valves which are operated by solenoids in injecting gaseous fuel in an internal combustion engine are described in U.S. Pat. No. 3,464,668, issued Sep. 2, 1969 to Jacob. In the device described in this patent, the ball valve employed is of metal so that there is metal to metal contact between the ball and its valve seat. Further, in this device, there is metal to metal contact between the reciprocally actuated "plunger" or armature and the ball as well as between the armature and the surrounding structure. This makes for high friction and stiff impacts with resultant wear which significantly lowers the useful life of the parts.

BRIEF SUMMARY OF THE INVENTION

The gaseous fuel injector of the present invention is a significant improvement over the prior art in providing a device with components having a significantly higher life. This end result is achieved by fabricating the ball of the valve, the motion stops for the reciprocating armature, and the surfaces against which the armature slides of a highly durable, low friction, impact cushioning, resilient plastic material. Further, the ball of the valve is placed above the armature and its seat so that the ball is normally seated in its valve and is driven to the open position by the armature so as to minimize the inertia effects of the closing valve. The ball and the seat only have to absorb the energy of the ball motion and mass as the armature separates from the ball at the point of ball-seat impact. This minimizes the wear on the ball to provide an enhanced seal life.

A valve seat is mounted in an outer housing, the valve seat having a lower seating surface with an aperture formed therein. A valve member which is in the form of a partial ball is mounted opposite the seating surface and is urged by a spring towards such surface. An armature is slidably mounted below the valve member in an inner housing. The armature has a stop member which forms a ledge running around the upper periphery thereof. A solenoid coil is mounted in the outer housing and surrounds the armature. When the coil is energized, the armature is driven upwardly against the valve thereby opening the valve. With the coil energized, the upper surface of the stop member abuts against the bottom of the valve seat thereby limiting the upward travel thereof. When the coil is not being energized, the spring drives the ball and the armature downwardly to a closed position whereat the lower surface of the stop member abuts against a top surface of the inner housing.

It is therefore an object of the invention to increase the useful operative life of gaseous fuel injectors.

It is a further object of the invention to provide a gaseous fuel injector having improved durability characteristics.

Other objects of the invention will become apparent in connection with the following description in conjunction with the accompanying drawings.

DETAILED DESCRIPTION OF THE INVENTION

Figure 1:
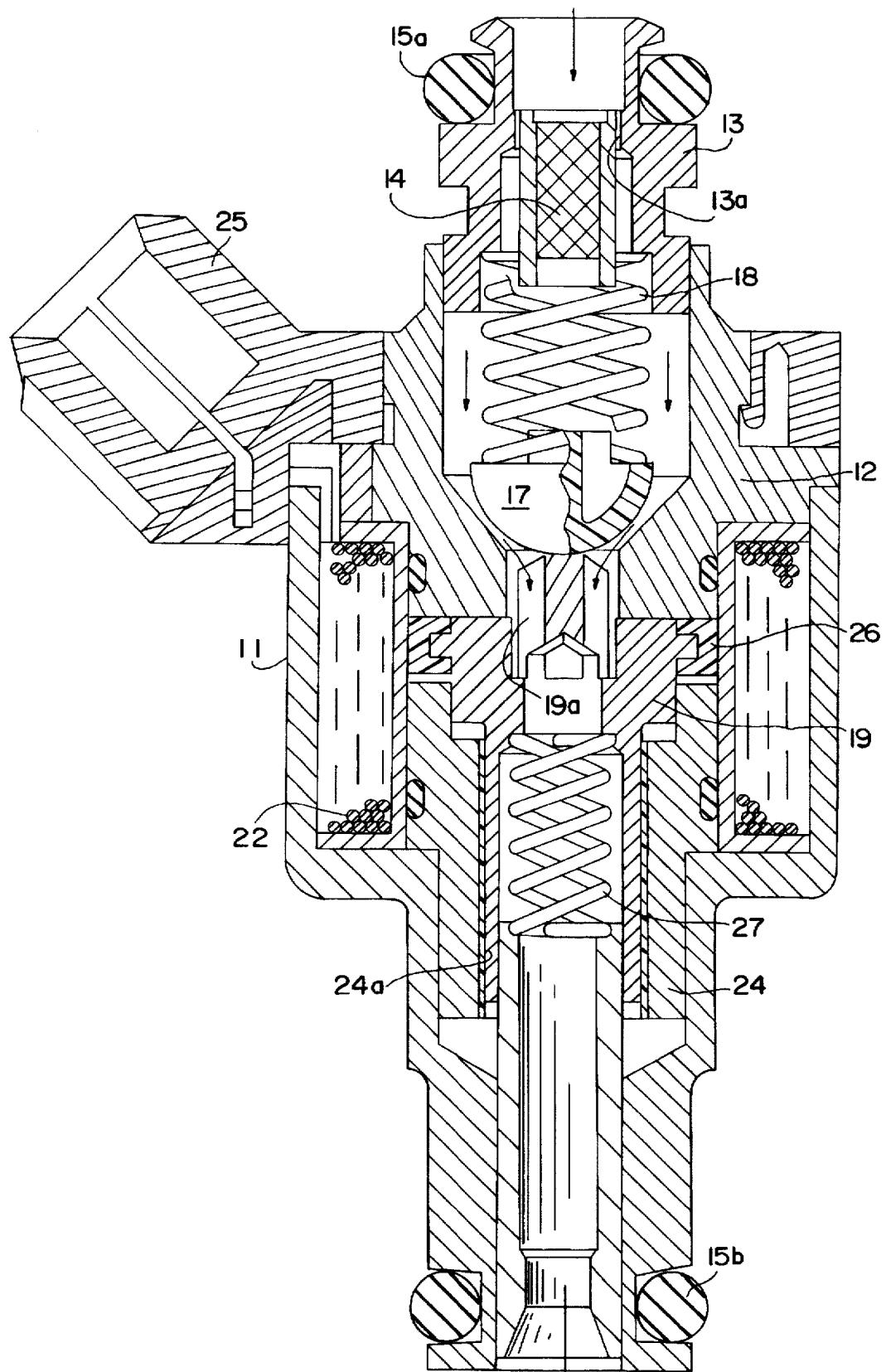
FIG. 1 is a front elevational view in cross section of a preferred embodiment of the invention shown with the valve in the open position.
Figure 2:
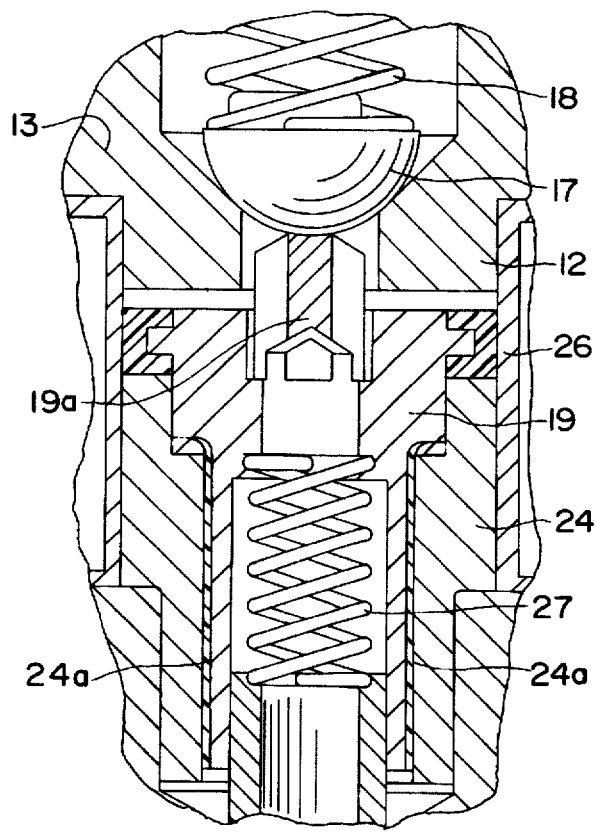
FIG. 2 is a front elevational view in cross section showing the valve and armature with the valve in the closed position.
Figure 4:
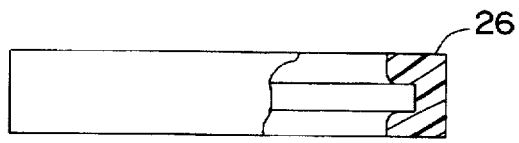
FIG. 4 is a front elevational view with partial cutaway section of the armature stop member of the preferred embodiment.
Figure 3:
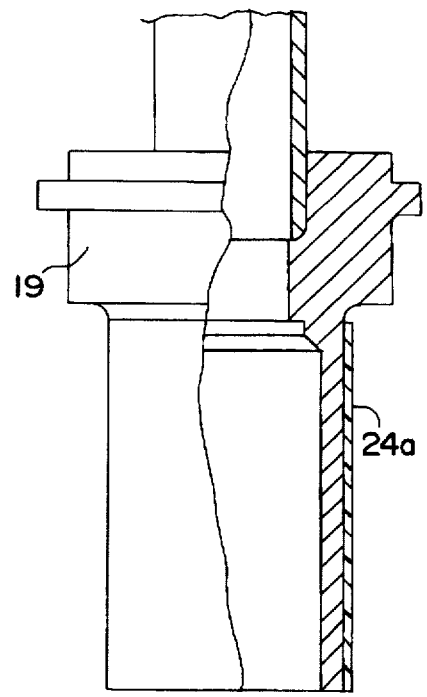
FIG. 3 is a front elevational view with partial cutaway section showing the armature of the preferred embodiment.

Referring to FIGS. 1 and 2, the injector of the invention has a housing 11 with a valve seat member 12 mounted therein. Mounted in valve seat member 12 is an entry member 13 which has a cylindrical central portion 13a in which a gas filter 14 is mounted. A pair of O-rings 15a and 15b are provided at the entry and exit of the injector to provide sealing at these locations in conjunction with mounting hardware (not shown).

Valve member 17 which is in the form of a partial ball is mounted in valve seat 12. Valve member 17 is urged towards the open portion at the bottom of seat 12 by means of spring 18, one end of which abuts against the inner wall of entry member 13 and the other end of which abuts against the valve member. Valve member 17 is fabricated of a high temperature durable plastic such as VESPEL which is a polyamide, commercially available from Dupont Corporation, AURUM commercially available from Advances WEB Products, Inc., or any similar non metallic material.

Armature member 19 which is fabricated of a magnetic material has an extension piece 19a which abuts against valve member 17. Armature member 19 is electromagnetically driven upwardly against valve member 17 whenever solenoid coil 22, which surrounds the armature, is energized. Coil 22 receives such energization from electrical control signals fed thereto through electrical plug 25.

Armature 19 is slidably mounted in inner housing 24 with spring 27 providing a counter balance. The inner surface 24a of the inner housing is of a high temperature durable plastic or PTFE weave which may be a polyamide such as Dupont VESPEL. When the solenoid is not being actuated, the valve 17 is kept in tight abutment against seat 12 by virtue of the action of spring 18, as shown in FIG. 2. Under such conditions, no gas is fed from the injector. When the solenoid is energized, armature 19 is driven upwardly with armature extension 19a driving valve 17 away from valve seat 12, as shown in FIG. 1. This permits the flow of gas through the injector as indicated by the arrows in FIG. 1.

A stop member 26 is attached to the periphery of armature 19 at a top portion thereof, forming a ledge extending outwardly therefrom. This stop member is made of a durable high temperature plastic such as DuPont VESPEL or Advanced WEB Products AURUM. Thus when the armature reaches its upper limit, as shown in FIG. 1 and its lower limit, as shown in FIG. 2, the top plastic surface of the stop member abuts against an opposing lower surface of seat 12 and the bottom plastic surface of the stop member abuts against the top surface of inner housing 24, thereby limiting wear by reducing impact loads due to the material's resilient characteristics.

While the invention has been described and illustrated in detail, it is to be clearly understood that this is intended by way of illustration and example only and is not to be taken by way of limitation, the scope of the invention being limited only by the terms of the following claims.

I claim:

1. A gaseous fuel injector comprising:

An outer housing, a valve seat mounted in the outer housing, said valve seat having a seating surface with an opening formed therein, a valve member in the form of a partial ball mounted opposite said seating surface, means for resiliently urging said valve member towards said seating surface, an inner housing having an inner surface, an armature slidably mounted in said inner housing in abutment with said inner surface, said armature having a stop member thereon for limiting the slidable travel thereof in said inner housing, said stop member running around the periphery of said armature and forming a ledge extending outwardly therefrom, the upper surface of said ledge, abutting against a lower surface of said seat when said armature is driven upwardly, the lower surface of said ledge abutting against an upper surface of said inner housing when said armature is driven downwardly, a solenoid coil mounted in said outer housing and surrounding said armature, and means for periodically feeding electrical power to said solenoid coil to energize said coil so as to electromagnetically drive said armature against said valve to effect the opening thereof, said valve member, the inner surface of said inner housing and the ledge of said stop member being of a durable resilient high temperature plastic material.

2. The fuel injector of claim 1 wherein said means for urging said valve comprises a coil spring.

* * * * *